(No Model.)
A. C. GALLAHUE.
VALVE GEAR FOR STEAM ENGINES.
No. 275,376. Patented Apr. 10, 1883.
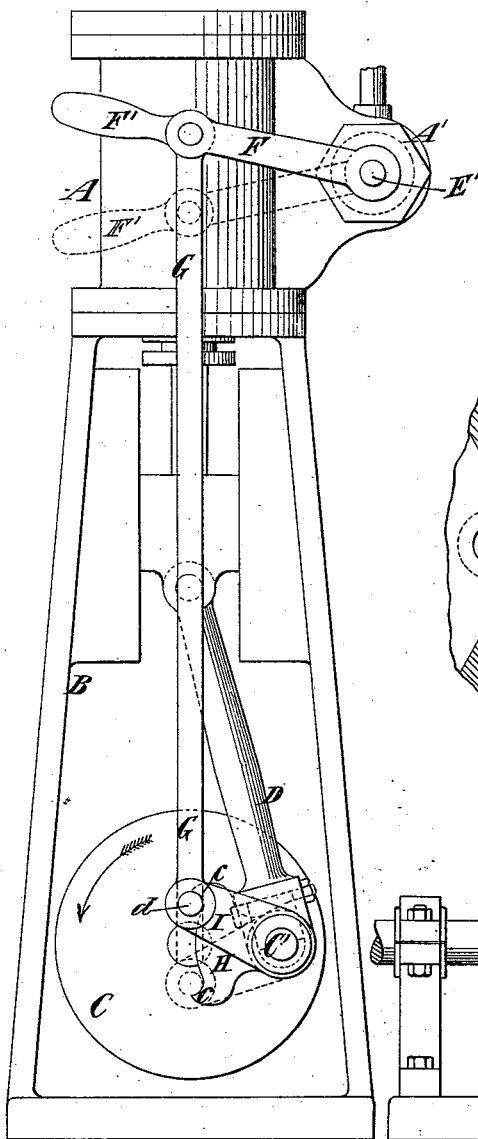
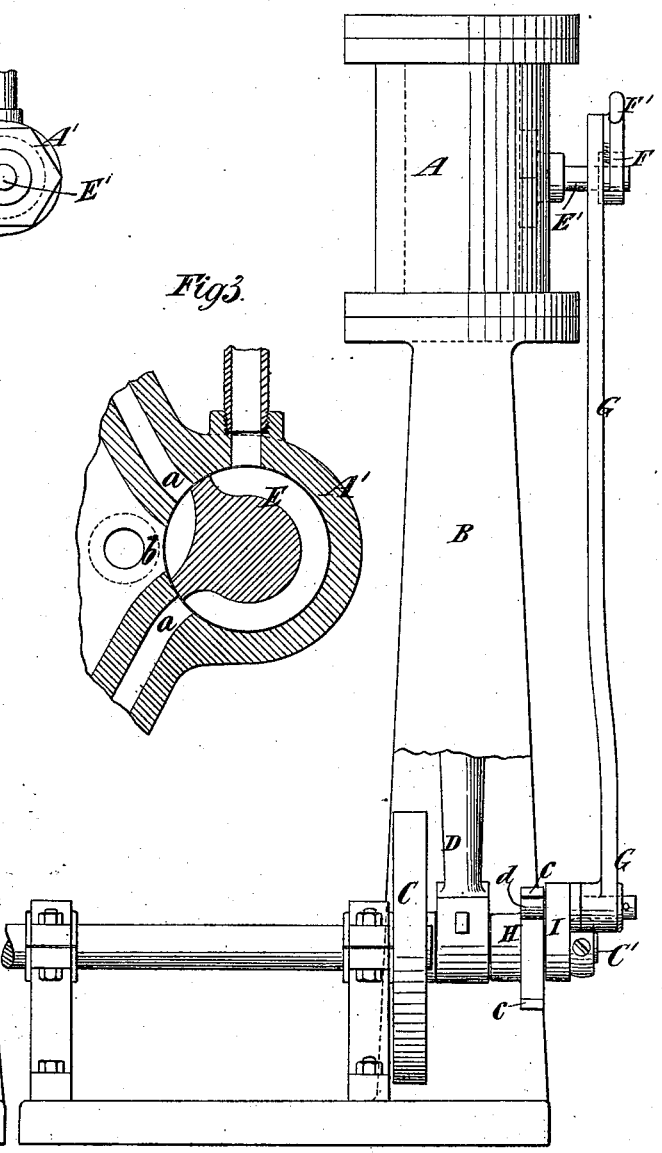
Witnesses:
Fred K. Hayner
Ed. L. Moran
Inventor:
A. C. Gallahue
by his Attorneys
Brown & Brown

UNITED STATES PATENT OFFICE.

ALPHEUS C. GALLAHUE, OF RHINEBECK, NEW YORK.

VALVE-GEAR FOR STEAM-ENGINES.

SPECIFICATION forming part of Letters Patent No. 275,376, dated April 10, 1883.

Application filed July 24, 1882. (No model.)

*To all whom it may concern:*

Be it known that I, ALPHEUS C. GALLAHUE, of Rhinebeck, in the county of Dutchess and State of New York, have invented a certain new and useful Improvement in Valve-Gear for Steam-Engines, of which the following is a specification.

The invention relates to engines in which the valve is operated by a rod which is connected with an arm or valve-crank secured upon the main crank-pin of the engine; and the object of the invention is to provide in a simple manner for operating the valve and reversing the engine, and to provide an engine which may be made at less cost than engines of the kind heretofore made.

The invention consists essentially in the combination, with the main crank-pin and valve-operating rod of an engine, of an arm to which said rod is connected loosely, fitting upon the exterior of said crank-pin and adapted to be turned thereon sufficiently to reverse the valve of the engine, and a device or devices fixed relatively to and carried by the crank-pin, constituting a stop or stops for limiting the turning movement of said arm on the crank-pin, and serving to drive said arm when the engine is moving in either direction. The device for actuating the loose arm may consist of an arm fast upon the crank-pin inside the loose arm, and the said fast arm has two shoulders or stops, between which a pin or stud on the loose arm may play, and either of which may engage with the loose arm for driving it. When the engine crank-shaft is rotating in one direction the pin or stud engages with one of the aforesaid shoulders or projections; but while the engine is running the loose arm may be turned on the crank-pin to shift the point of connection between it and the valve-operating rod to the other side of the crank-shaft to reverse the engine, whereupon the loose arm will be caused to move by the pin or stud engaging with the opposite shoulder or projection, as hereinafter more fully described. The loose arm may be placed on the crank-pin inside the arm which is fast on the crank-pin, and the loose arm may be provided with the shoulders or projections and the fast arm with the pin or stud, with which one or the other of said shoulders or projections engages.

The invention also consists in a combination of parts hereinafter described and claimed.

In the accompanying drawings, Figure 1 represents a front elevation of an engine embodying my invention. Fig. 2 represents a side elevation thereof. Fig. 3 represents a sectional view of the valve-chest and valve on a larger scale. Fig. 4 represents a detail view of the two arms which are fitted to the crank-pin; and Figs. 5 and 6 represent a modification of my invention.

Similar letter of reference designate corresponding parts in all the figures.

The engine here shown is of the vertical type, but the invention is equally applicable to engines of other kinds.

Referring first to Figs. 1 to 4, A designates the cylinder, and B the main frame, of the engine.

C designates the crank, and C' designates the crank-pin or wrist to which the connecting-rod D is connected.

A' designates the valve-chest of the engine, and E an oscillating valve which controls the admission of steam to the ports *a a*, and the exhaust therefrom through the exhaust-port *b*. The valve-spindle E' has an arm or lever, F, secured upon it; and G designates the valve-operating rod, which is connected with the arm or lever F. The said arm or lever is prolonged beyond the point of connection with the rod G, and forms a handle, F', for shifting the valve.

Although I have only shown my invention as embodied in an engine having an oscillating valve, it may be employed in engines having valves of other forms. For example, the rod G might be employed to operate a rock-shaft for operating a slide-valve; or it may be otherwise connected for operating a slide-valve.

H designates an arm which is rigidly secured upon the crank-pin C' outside of the connecting-rod D, and outside the arm H is an arm, I, which is loose upon the crank-pin C'. The valve-operating rod G is connected with and operated by the loose arm I. The arm H is provided with two shoulders or projections, *c*, placed at some distance apart, and the loose arm I is provided with a pin or stud, *d*, which passes the plane of the arm H, and is capable of considerable play or lost motion between the shoulders or projections c. If desired, the pin or stud d might be on the fast arm H and the shoulders or projections c on the loose arm I, in which case both arms would be slightly varied in form. As the crank turns, one or the other of the shoulders or projections c engages with the pin or stud d, and so causes the loose arm I to move with the arm H.

When it is desired to reverse the engine the hand is applied to the handle F', and valve-lever F, rod G, and arm I are all shifted instantly into the position shown in dotted lines in Fig. 1, and by this shifting the engine is reversed. The other shoulder or projection now comes into engagement with the pin or stud d and operates the valve-rod and valve. The play between the pin or stud d and the shoulders or projections c is sufficient to enable the valve to be shifted by hand when it is desired to reverse the engine.

In Fig. 1 the engine crank-shaft is represented as adapted to rotate in the direction of the arrow, one of the shoulders or projections c being in engagement with the pin d. When it is desired to reverse the engine all that is necessary is to push the lever F, the rod G, and the arm I into the positions shown in dotted lines in Fig. 1. This movement will reverse the engine and will carry the stud or pin d into contact with the other shoulder or projection c, which will then drive it.

In Figs. 5 and 6 I have represented a modification of my invention in which the arm H is dispensed with. The rod G is connected with the loose arm I, as before described, and said arm is limited in its movements by a pin or stud, s, which projects from the crank-pin C' and works in a slot, s', in the said arm. When the engine is rotating in one direction the pin or stud s engages with one end of said slot and when rotating in the other direction engages with the other end of said slot. The pin or stud therefore limits the turning movement of the arm I and drives it.

It will be observed that in both forms of my invention herein shown the device or devices which drive the arm I are fixed relatively to the crank-pin. In the construction shown in Figs. 1 and 2 the shoulders c, which drive the arm I, are formed on an arm, H, which is securely fastened to the crank-pin, and in the construction shown in Figs. 5 and 6 the pin s, which constitutes the driver, is inserted in the crank-pin.

What I claim as my invention, and desire to secure by Letters Patent, is—

1. The combination, with the main crank-pin of an engine and a valve-operating rod, of an arm to which said rod is connected, loosely fitting upon the exterior of said crank-pin and adapted to be turned thereon sufficiently to reverse the valve of the engine, and a device or devices fixed relatively to the crank-pin, constituting a stop or stops for limiting the turning movement of said arm on the crank-pin, and serving to drive said arm when the engine is moving in either direction, substantially as specified.

2. The combination, with the main crank-pin of an engine, of two arms, one securely fixed to the crank-pin and the other loosely fitting thereon, a valve-operating rod connected with the loose arm, two shoulders or projections on one arm, and a pin or stud on the other arm, adapted to play between said shoulders or projections, and through which the loose arm is caused to move with the fast arm, substantially as specified.

3. The combination of the crank C, crank-pin C', arm H, fast on said crank-pin, and provided with shoulders c, arm I, loose upon said crank-pin, and provided with the pin d, the valve E and its arm F, and the valve-operating rod G, connecting the arm I with the arm F, substantially as specified.

A. C. GALLAHUE.

Witnesses:
CHANDLER HALL,
FREDK. HAYNES.